US005688311A

United States Patent [19]
Adamic

[11] Patent Number: 5,688,311
[45] Date of Patent: Nov. 18, 1997

[54] INK JET INKS CONTAINING LONG CHAIN ALCOHOLS

[75] Inventor: Raymond J. Adamic, Corvallis, Oreg.

[73] Assignee: E. I. Du Pont de Nemours and Company, Wilmington, Del.

[21] Appl. No.: 791,370

[22] Filed: Jan. 30, 1997

[51] Int. Cl.$^6$ .................................................. C09D 11/02
[52] U.S. Cl. .................. 106/20 R; 106/22 R; 106/20 D
[58] Field of Search ...................... 106/20 R, 22 R, 106/20 D

[56] References Cited

U.S. PATENT DOCUMENTS

| | | | |
|---|---|---|---|
| 4,243,694 | 1/1981 | Mansukhani | 106/21 A |
| 4,395,287 | 7/1983 | Kobayashi et al. | 106/20 R |
| 4,513,467 | 4/1985 | Yano et al. | 106/20 B |
| 5,085,698 | 2/1992 | Ma et al. | 106/20 R |
| 5,098,476 | 3/1992 | Baker | 106/22 R |
| 5,151,120 | 9/1992 | You et al. | 106/22 E |
| 5,165,968 | 11/1992 | Johnson et al. | 427/288 |
| 5,270,730 | 12/1993 | Yaegashi et al. | 106/31 R |
| 5,427,611 | 6/1995 | Shirota et al. | 106/22 D |
| 5,456,743 | 10/1995 | Fry | 106/20 R |
| 5,503,664 | 4/1996 | Sano et al. | 106/20 R |
| 5,561,175 | 10/1996 | Imagawa | 106/20 A |

*Primary Examiner*—Helene Klemanski

[57] ABSTRACT

An aqueous ink jet ink which contains an aqueous carrier medium; a colorant, which may be a pigment dispersion or a dye, and a long chain alcohol having at least 8 carbon atoms present in the amount of 0.05 to 5% by weight, based on the total weight of the ink exhibit reduced mottle and, when used in an ink set to form a multicolor image, reduced halo.

15 Claims, No Drawings

INK JET INKS CONTAINING LONG CHAIN ALCOHOLS

BACKGROUND OF THE INVENTION

The invention relates to aqueous inks for ink jet printers, and more particularly, to aqueous ink jet inks containing long chain alcohols as additives to improve mottle and halo in ink jet inks.

Ink jet printing has become increasingly popular, particularly for so-called "desk-top publishing", because of its capability to produce small volumes of printed matter from digital input at high throughput speeds. Recent equipment developments have led to the introduction of multi-color ink jet printers that integrate colored graphics and text. To some extent, however, the applications of ink jet printing have been limited due to the demanding requirements the inks must meet in order to provide high quality text and graphics.

Ideally, the ink used to prim the text (generally black) will exhibit the sharp edge acuity needed to produce high print quality. One method of achieving sharp edge acuity is to select an ink that has relatively high surface energy; i.e., the ink will tend not to absorb into the printing media (generally paper), leaving the ink colorant (dye or pigment) on the media surface.

Another factor affecting ink selection is the tendency of inks to "bleed" when printed adjacent to one another; that is, the two inks intermingle at the interface. One approach to minimizing bleed is to select inks having relatively low surface energy whereby the inks will rapidly absorb into the media, and thus be less affected by subsequent colors that are printed.

One approach to balancing the need for sharp edge acuity in the text, while minimizing bleed, has been to select a black ink exhibiting high surface energy for use with colored inks (cyan, magenta, and yellow) having low surface energies. Unfortunately, however, this approach is prone to produce a white or weakly colored region, referred to as "halo", at the interface of the black and colored inks. In some instances, one or more of the inks also may shrink back from their original printed areas. These tendencies of halo formation and shrinkage cause a loss of image optical density, and a loss of image quality, at the ink interface.

Another problem that exists in printing black/grey images is "mottle". Mottle is defined as the appearance of a spotty or uneven area fill in black/grey areas of output and is thought to result from the segreagation of the colorant on the paper surface. This problem, which is paper or media dependant, leads to an unsightly or less than ideal image.

Thus, there is a need for improved inks that retain sharp edge acuity for printed text, have minimum bleed, have no mottle and do not present the halo formation and shrinkage problems heretofore observed at the interface of black and colored inks.

SUMMARY OF THE INVENTION

The present invention provides an aqueous ink jet ink comprising:
(a) an aqueous carder medium;
(b) a colorant; and
(c) at least one long chain alcohol having at least 8 carbon atoms present in the mount of 0.05 to 2% by weight, preferably 0.075 to 0.3% by weight, based on the total weight of the ink.

In another embodiment, the invention provides an ink set for printing at least two distinct colors on a print medium, the ink set comprising:

(1) a first ink containing
   (a) an aqueous carder medium;
   (b) a colorant; and
   (c) at least one long chain alcohol having at least 8 carbon atoms, present in an amount of 0.05 to 2% by weight, preferably 0.075 to 0.3% by weight, based on the total weight of the ink, and 2) a second ink containing an aqueous carrier medium and a colorant;

wherein the colorant in at least one of the first and second inks is a pigment.

The inks of the invention may be used with a variety of ink jet printers such as continuous, piezoelectric, drop-on-demand and thermal or bubble jet drop-on-demand, and are particularly adapted for use in thermal ink jet printers. The inks may also be useful in air brush printing devices.

DETAILED DESCRIPTION OF THE INVENTION

The ink compositions of this invention comprise an aqueous carrier medium, a colorant, and at least one alcohol having at least 8 carbon atoms. These inks are stable over long periods, both in storage and in the printer. The inks may be adapted to the requirements of a particular ink jet printer to provide a balance of light stability, smear resistance, viscosity, surface tension, high optical density, and crust resistance.

Aqueous Carrier Medium

The aqueous carrier medium is water or a mixture of water and at least one water soluble organic solvent. Selection of a suitable mixture depends on requirements of the specific application, such as desired surface tension and viscosity, the selected colorant, drying time of the ink, and the type of substrate onto which the ink will be printed. Representative water-soluble organic solvents that may be selected are disclosed in U.S. Pat. No. 5,085,698. A mixture of water and a polyhydric alcohol, such as diethylene glycol, is preferred as the aqueous carrier medium.

If a mixture of water and a water-soluble solvent is used, the aqueous carrier medium usually contains from about 30% to about 95% water with the balance (i.e., 70 to 5%) being the water-soluble solvent. Preferably, the aqueous carrier medium is 60–95%, by weight, water. The aqueous carrier medium comprises 70 to 99.8%, by weight of the total ink composition, depending on the type of colorant selected. Preferably, the aqueous carrier medium comprises 94–99.8% when an organic pigment is selected; 70 to 99.8% when an inorganic pigment is selected; and 80 to 99.8% when a dye is selected.

Colorants

Colorants useful in the ink compositions of this invention include both dyes and pigments. By the term "dye" we mean a colorant that becomes soluble at some point during the printing process. By "pigment" we mean a colorant that is insoluble (i.e., in particulate or crystalline form) throughout the printing process. Pigments are the preferred colorants for use in the compositions of this invention.

Pigments:

Useful pigments comprise a wide variety of organic and inorganic pigments, alone or in combination. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 15 microns, preferably 0.005 to 5 microns, and most preferably from 0.01 to 0.3 micron.

The selected pigment may be used in dry or wet (i.e., presscake) form. In presscake form, the pigment is not aggregated to the extent that it is in dry form and therefore do not require as much deaggregation in the process of preparing the inks. Representative commercial dry and presscake pigments that may be used in practicing the invention are disclosed in U.S. Pat. No. 5,085,698 issued Feb. 4, 1992.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

Dyes

The dyes may be those that are soluble in the aqueous carrier medium or those that are insoluble, the latter being referred to herein as "dispersed dyes."

The color and amount of disperse dye used in the ink is largely a function of choice, being primarily dependent upon the desired color of the print achieved with the ink, the purity of the dye, and its strength. Low concentrations of dye may not give adequate color vividness. High concentrations may result in poor printhead performance or unacceptably dark colors. The disperse dye may be present in the amount of 0.01 to 20%, by weight, preferably 0.05 to 8%, by weight, more preferably 1 to 5%, by weight, based on the total weight of the ink. Disperse dyes that may be useful in this invention are disclosed in U.S. Pat. No. 5,053,495, U.S. Pat. No. 5,203,912, U.S. Pat. No. 5,102,448, etc.

Conventional dyes such as anionic, cationic, amphoteric and non-ionic dyes are useful in this invention. Such dyes are well known to those of ordinary skill in the art. Anionic dyes are those dyes which in aqueous solution yield colored anions and cationic dyes are those which in aqueous solution yield colored cations. Typically anionic dyes contain carboxylic or sulfonic acid groups as the ionic moiety. Cationic dyes usually contain quaternary nitrogen groups.

The types of anionic dyes most useful in this invention are, for example, Acid, Direct, Food, Mordant, and Reactive dyes. Anionic dyes are selected from the group consisting of nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds and phthalocyanine compounds.

The types of cationic dyes that are most useful in this invention include mainly the basic dyes and some of the mordant dyes that are designed to bind acidic sites on a substrate, such as fibers. Useful types of such dyes include the azo compounds, diphenylmethane compounds, triarylmethanes, xanthene compounds, acridine compounds, quinoline compounds, methine or polymethine compounds, thiazole compounds, indamine or indophenyl compounds, azine compounds, oxazine compounds, and thiazine compounds, among others, all of which are well known to those skilled in the art.

The color and amount of dye used in the ink composition is largely a function of choice, being primarily dependent upon the desired color of the print achieved with the ink, the purity of the dye and its strength. The dye is typically present in the amount of 0.01 to 20%, by weight, preferably 0.05 to 8%, more preferably 1 to 5%, based on the total weight of the ink.

Dispersants

Polymeric dispersants suitable for practicing the invention include random polymers and structured polymeric dispersants such as block copolymers and branched-type polymers. The polymers may be anionic, cationic, or non-ionic in nature.

Random polymers are not as effective in stabilizing pigment dispersions as structured polymers and, therefore, are not preferred. However, a random polymer which has both hydrophilic moieties for aqueous solubility and hydrophobic moieties for interaction with the pigment and an average molecular weight to contribute to the dispersion stability can be effectively used to practice the present invention. Such polymeric dispersants are disclosed in U.S. Pat. No. 4,597,794.

The block polymers suitable for practicing the invention are AB, BAB and ABC type structures. A block polymer which has hydrophobic and hydrophilic blocks and balanced block sizes to contribute to the dispersion stability may be advantageously used to practice this invention. Functional groups can be built into the hydrophobic (pigment binding) block for stronger specific interactions between the pigment and the polymer dispersant to give an improved dispersion stability. A detailed description of these polymers can be found in the aforementioned U.S. Pat. Nos. 5,085,698 and 5,272,201 and in EPO application 0 556 649 A1.

It may be necessary to make salts of either the functional groups contained in the polymer to render it soluble in the aqueous carrier medium. Salts of the acid monomers can be made with the counter component being selected from organic bases such as mono-, di-, tri-methylamine, morpholine, n-methyl morpholine; alcohol amines such as dimethylethanolamine (DMEA), methyldiethanolamine, mono-, di-, and tri-ethanolamine; pyridine; 2-amino-2-methyl-1-propanol; ammonium hydroxide; tetra-alkylammonium salts such as tetramethylammonium hydroxide, tetraethyl- ammonium hydroxide; alkali metals such as lithium, sodium and potassium, and the like. Preferred neutralizing agents include dimethylethanolamine, 2-amino-2-methyl-1-propanol, and sodium and potassium hydroxides, with potassium hydroxide being particularly preferred for inks to be used in thermal ink jet printers. Salts of the amino monomers can be made with the counter component being selected from organic acids such as acetic acid, formic acid, oxalic acid, dimethylol propionic acid, halogens such as chloride, fluoride, and bromide, and other inorganic acids, such as sulfuric acid, nitric acid, phosphoric acid and the like. It is also possible to convert the amino group into a tetra-alkyl ammonium salt. Amphoteric polymers, that is polymer that contains both an acid group and an amino group, may be used as is or can be neutralized with either addition of acid or base.

The amount of the dispersant polymer depends on the structure, molecular weight and other properties of the dispersant polymer, and on the other components of the ink composition. The block polymers that are selected in practicing the invention have number average molecular weight of below 20,000, preferably below 10,000, and typically in the range of 1,500 to 6,000.

The polymeric dispersant may be present in the amount of 0.1 to 25%, preferably 0.1 to 8% by weight, based on the total weight of the ink composition. If the amount is too high, it will be difficult to maintain the desired ink viscosity.

Dispersion stability will be adversely affected if insufficient polymer is present.

Long Chain Alcohols

The long chain alcohols suitable for use in the inks of the invention have at least 8 carbon atoms. Some useful examples of long chain alcohols having at least 8 carbon atoms include octanol, tetradecanol, undecanol, stearyl alcohol, 2-decanol, decanol, 2-dodecanol, 1,2-dodecanediol, tridecanol, hexadecanol, 1,12-dodecanediol, 1,2-decanediol, 1,10-decanediol, 4-decanol, 2-octanol, 3-octanol, nonanol, 2-undecanol, 2-tetradecanol, 1,2-tetradecanediol, 1,14-tetradecanediol and heptadecanol. Derivatives of long chain alcohols are also useful in this invention.

The long chain alcohol is present in the ink in an amount of 0.05 to 5%, preferably 0.05 to 2%, based on the total weight of the ink composition. Higher concentrations of the alcohol may result in destabilizing the pigment dispersion or in poor print quality because of increased penetration that could cause a lower optical density. As little as 0.05% of the alcohol has some effect in reducing "mottle", but about 0.07 to 0.09% is a preferred range. As little as 0.08% of the alcohol has some effect in reducing "halo", but about 0.1 to 0.2% is a preferred range.

Other Ingredients

The ink may contain other ingredients. For example surfactants may be used to alter surface tension as well as maximize penetration. Biocides may be used in the ink compositions to inhibit growth of microorganisms. In addition, sequestering agents such as EDTA may also be included to eliminate deleterious effects of heavy metal impurities. Other known additives, such as humectants, viscosity modifiers and other acrylic or non-acrylic polymers may also be added to improve various properties of the ink compositions.

Ink Preparation and Properties

The pigmented ink is prepared by premixing the selected pigment(s) and dispersant in water and then dispersing the pigment in a horizontal mini mill, a ball mill, roll mill, an attritor, or by passing the mixture through a plurality of nozzles within a liquid jet interaction chamber at a liquid pressure of at least 1000 psi to produce a uniform dispersion of the pigment particles in the aqueous carrier medium. The dye-based ink is prepared in a well agitated vessel rather than in dispersing equipment. The long chain alcohol, as well any cosolvents or other additives, may be present during the initiat mixing step or may be added later.

It is generally desirable to make the inks in concentrated form and to subsequently dilute the ink to the appropriate concentration. This technique permits preparation of a greater quantity of ink from the equipment. By dilution, the ink is adjusted to the desired viscosity, color, hue, saturation density, and print area coverage for the particular application.

Jet velocity, separation length of the droplets, drop size, and stream stability are greatly affected by the surface tension and the viscosity of the ink. Inks suitable for use with ink jet printing systems should have a surface tension in the range of about 20 dyne/cm to about 70 dyne/cm and, more preferably, in the range 30 dyne/cm to about 70 dyne/cm. Acceptable viscosities are no greater than 20 cP, and preferably in the range of about 1.0 cP to about 10.0 cP. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of ink jet printers such as continuous, piezoelectric drop-on-demand and thermal or bubble jet drop-on-demand, and are particularly adapted for use in thermal ink jet printers. The inks have excellent storage stability for a long period and do not clog in an ink jet apparatus. Fixing the ink on the image recording material, such as, paper, fabric, film, etc., can be carried out rapidly and accurately. The printed ink images have clear color tones, high density, excellent water resistance and lightfastness. Furthermore, the ink does not corrode parts of the ink jet printing device.

Ink Sets

The invention also provides for ink sets useful in the preparation of multicolor images. Yellow, cyan, magenta and black inks typically comprise the ink sets used for color ink jet printing. In accordance with the invention, at least one ink in the ink set comprises an ink containing the long chain alcohols described above and at least one of the inks in the ink set comprises a pigmented ink. Ink sets of the invention show reduced bleed, halo and mottle.

EXAMPLES

Example 1

A triblock polymer dispersant, poly(methacrylic acid-β-benzyl methacrylate-co-methylmethacrylate-β-ethoxytriethylene glycol methacrylate), ("MAA//BzMA//ETEGMA") (12//15//4) was prepared as follows:

To a solution of 170.8 g (0.73 mol) of 1,1-bis (trimethylsiloxy)-2-methyl-1-propene and 5.3 mL of tetrabutyl ammonium m-chlorobenzoate (1.0M solution in acetonitrile) in 3500 g THF was slowly added 1396.2 g (8.84 mol) of trimethylsilyl methacrylate in 35 minutes under nitrogen atmosphere. The temperature rose from 22.1° C. to 54.7° C. When the temperature fell to 46.4° C., 20 minutes later, 0.5 mL of tetrabutyl ammonium m-chlorobenzoate solution was added. No exotherm was detected. To the reaction mixture was then slowly added 1943.0 g (11.0 mol) of benzyl methacrylate (dried over molecular sieves) in 30 minutes. The temperature rose to 63.2° C. during the course of the addition. When the temperature fell to 58.2° C. about 30 minutes later, 0.5 mL of tetrabutyl ammonium m-chlorobenzoate was added and no exotherm was detected. To the reaction mixture was then added 733.0 g (2.98 mol) of ethoxytriethyleneglycol methacrylate (dried over molecular sieves) over 10 minutes. The reaction mixture was stirred overnight. It was quenched with 613 g of methanol. The volatiles were stripped off by distillation while 2-pyrrolidone was added to displace the solvent to give a polymer solution at 44.2% solids. Then, 791.9 g of the polymer solution were mixed with 99.3 g of potassium hydroxide solution (45.9% in deionized water) and 2608.8 g of deionized water until a homogeneous 10% polymer solution was obtained.

Next, a black pigment dispersion was prepared having the following composition:

| Ingredient | Amount (parts by weight) |
|---|---|
| FW18, Carbon black pigment (Degussa Corp., Allendale, NJ 07041) | 60.6 |
| Polymer (10% solution) | 300.0 |
| Deionized water | 240.0 |

The above mentioned components were premixed in a plastic beaker by mechanical stirring until no lumps or dry clumps were visible. The mixture was dispersed in a microfluidizer (Microfluidics Corp., Watham, Mass.) by passing it through the interaction chamber 5 times under a liquid pressure of about 8,000 psi. The resulting pigment dispersion had a 10% pigment concentration with an average particle size of 106 nm as determined by Brookhaven BI-90 particle sizer. The dispersion was filtered through a 1 micron high efficiency filter bag (3M Filtration Products, St. Paul, Minn.). The final pH was 7.8.

Inks were then prepared from the dispersion above. The inks were placed into the ink reservoir of thermal ink jet pens and a monochrome print sample of text and graphics with large enough area fills to show evidence of mottling was printed on a variety of papers using a DeskJet® 660 printer, Hewlett Packard, Palo Alto, Calif. Mottle was determined by visual inspection of the samples. The samples were judged to be acceptable, marginal or unacceptable. Samples which show "banding" in addition to mottling are considered even more objectionable. Banding is defined as dark bands of ink between print swaths. Results are shown in Table 1.

The inks used had the following composition:

| Ingredient | Amount (% by weight) | |
|---|---|---|
| | Sample | Control |
| FW18 black pigment | 3.0 | 3.0 |
| Polymer dispersant | 1.25 | 1.25 |
| 2-Pyrollidone | 5.0 | 5.0 |
| Liponics ® EG-1, Lipo Chemicals Co, Patterson, NJ | 6.0 | 6.0 |
| Zonyl ®FSA, DuPont Company, Wilmington, DE | 0.0100 | 0.0025 |
| Octanol | 0.0075 | — |
| Water to make 100% | | |

TABLE 1

| Paper | Sample | Control |
|---|---|---|
| Springhill ® Relay DP ®[a] | marginal | unacceptable/banding |
| Ardor ® Xerocopy[b] | acceptable | marginal |
| MoDo Datacopy ®[c] | acceptable | marginal |
| Weyerhauser First Choice ®[d] | acceptable | marginal |
| Hansol ® PPC[e] | acceptable | unacceptable |

[a]International Paper Company, Lock Haven, PA.
[b]Georgia-Pacific Corp., Nekoosa, WI.
[c]Mo Och Domsjo A. B., Sweden
[d]Weyerhauser Company, Tacoma, WA
[e]Hansol Inc., Korea Example 2

Sample and control inks having the following compositions were prepared and tested using the same procedures in Example 1. Results are shown in Table 2.

| Ingredient | Amount (% by weight) | |
|---|---|---|
| | Sample | Control |
| FW18 black pigment | 2.75 | 2.75 |
| Polymer dispersant | 1.15 | 1.15 |
| 2-Pyrollidone | 5.0 | 5.0 |
| Liponics ® EG-1 | 4.25 | 4.25 |
| N-methyl pyrollidone | 2.0 | 2.0 |
| Zonyl ®FSA | 0.005 | 0.005 |
| Octanol | 0.075 | — |
| Water to make 100% | | |

TABLE 2

| Paper | Sample | Control |
|---|---|---|
| MoDo Datacopy ® | acceptable | marginal |
| Kymcopy Lux[a] | marginal | unacceptable/banding |
| Springhill ® Relay DP ® | marginal/light band | unacceptable/banding |
| Union Camp Jamestown[b] | acceptable | unacceptable/banding |
| Ardor ® Xerocopy | marginal | unacceptable/banding |

[a]Kymi Paper Mills Ltd, Finland
[b]Union Camp Corp., Franklin, VA

Example 3

Inks having the following compositions were prepared and tested according to the procedures of Example 1. Results are shown in Table 3.

| Ingredient | Amount (% by weight) | |
|---|---|---|
| | Sample | Control |
| FW18 black pigment | 3.0 | 3.0 |
| Polymer dispersant | 1.25 | 1.25 |
| 2-Pyrollidone | 4.0 | 4.0 |
| Liponics ® EG-1 | 6.0 | 6.0 |
| N-methyl pyrollidone | 2.0 | 2.0 |
| Zonyl ®FSA | — | 0.0025 |
| Octanol | 0.1 | — |
| Water to make 100% | | |

TABLE 3

| Paper | Sample | Control |
|---|---|---|
| MoDo Datacopy ® | acceptable | marginal |
| Hansol ® PPC | acceptable | marginal |
| Springhill ® Relay DP | acceptable | marginal |
| Union Camp Jamestown | acceptable | marginal |
| Champion Datacopy[a] | acceptable | marginal |
| Ardor ® Xerocopy | acceptable | marginal |

[a]Champion International Corp., Stamford, CT.

Example 4

A ink set having the following compositions were prepared:

| Ingredient | Amount (% by weight) | |
|---|---|---|
| | Sample | Control |
| FW18 black pigment | 3.0 | 3.0 |
| Polymer dispersant | 1.25 | 1.25 |
| 2-Pyrollidone | 5.0 | 5.0 |
| Liponics ® EG-1 | 8.0 | 6.0 |
| Zonyl ®FSA | 0.01 | 0.0025 |
| Dodecanol | 0.2 | — |
| Water to make 100% | | |

| Ingredient | Amount (% by weight) | | |
|---|---|---|---|
| | Cyan | Magenta | Yellow |
| Acid Blue 9/Direct Blue 199 | 2–3 | — | — |
| Reactive Red 180/Acid Red 52 | — | 2–3 | — |
| Acid Yellow 23 | — | — | 2–3 |

-continued

| Ingredient | Amount (% by weight) | | |
|---|---|---|---|
| | Cyan | Magenta | Yellow |
| 1,5-pentanediol | 8.0 | 8.0 | 8.0 |
| 2-ethyl-2-hydroxymethyl-1,3-propanediol | 7.5 | 7.5 | 7.5 |
| 2-Pyrollidone | 7.5 | 7.5 | 4.0 |
| nonionic surfactant | 2.0 | 2.0 | 2.5 |
| Calcium nitrate | — | — | 7.0 |
| Magnesium nitrate | 6.0 | 6.0 | — |
| Biocide (Proxel ® GXL) | 0.2 | 0.2 | 0.2 |
| 2-[N-morpholino]ethanesulfonic acid | — | — | 0.2 |
| tris[hydroxymethyl]aminomethane | 0.2 | 0.2 | — |
| Water to make 100% | | | |

The colored inks were filled into a tri-chambered pen. The black and colors were 2 pass printed using a DeskJet® 550C printer with the print sample having the black ink next to the color ink. Halo was rated visually by comparison to a set of standard samples showing varying degrees of halo. These standards were used to define a rating scale of 1–7, where 1 represents no visible halo and 7 represents a white gap in excess of 1 millimeter appearing at the edge of the black border where it abutted the color block. Scores of 3 or greater were considered unacceptable. Results are shown in Table 4 below. Scores reflect an average of all colors.

TABLE 4

| Paper | Sample | Control |
|---|---|---|
| Gilbert ® Bond[a] | 1 | 6 |
| Reymat ®[b] | 2 | 7 |
| Berga Laser ®[c] | 3 | 7 |

[a]Mead Corp., Menasha, WI
[b]Aussedat-Rey, France
[c]Enso Gutzeit, Finland

Example 5

Example 4 was repeated except that only black inks were used having the following compositions. Results are shown in Table 5.

| Ingredient | Amount (% by weight) | | |
|---|---|---|---|
| | Sample 1 | Sample 2 | Control |
| FW18 black pigment | 3.0 | 3.0 | 2.75 |
| Polymer dispersant | 1.36 | 1.25 | 1.38 |
| 2-Pyrollidone | 4.0 | 5.0 | 5.0 |
| Liponics ® EG-1 | 6.0 | 6.0 | 4.25 |
| Zonyl ®FSA | 0.0075 | 0.0075 | 0.05 |
| Dodecanol | 0.125 | 0.10 | — |
| Water to make 100% | | | |

TABLE 5

| Paper | Sample 1 | Sample 2 | Control |
|---|---|---|---|
| Reymat ® | 4 | | 6 |
| Classic Crest[a] | | 3 | 5 |
| Ardor ® Xerocopy | 2 | | 4 |

[a]Kimberly Clark Corp., Neenah, WI

What is claimed is:

1. An aqueous ink jet ink comprising:
 (a) an aqueous carrier medium;
 (b) a colorant; and
 (c) at least one long chain alcohol having at least 8 carbon atoms present in the amount of 0.05 to 5% by weight, based on the total weight of the ink.

2. The ink of claim 1 wherein the colorant comprises a pigment dispersion comprising a pigment and a dispersant.

3. The ink of claim 2 wherein the dispersant is a polymeric dispersant.

4. The ink of claim 3 wherein the polymeric dispersant is selected from the group consisting of block and graft copolymers, and wherein the ink composition comprises 0.1 to 8% pigment, 0.1 to 8% dispersant, 79 to 99.75% of the aqueous carrier medium and 0.05 to 5% by weight of the long chain alcohol, based on the total weight of the ink.

5. The ink of claim 1 wherein the long chain alcohol is selected from the group consisting of octanol, tetradecanol, undecanol, stearyl alcohol, 2-decanol, decanol, 2-dodecanol, 1,2-dodecanediol, tridecanol, hexadecanol, 1,12-dodecanediol, 1,2-decanediol, 1,10-decanediol, 4-decanol, 2-octanol, 3-octanol, nonanol, 2-undecanol, 2-tetradecanol, 1,2-tetradecanediol, 1,14-tetradecanediol, heptadecanol and mixtures thereof.

6. The ink of claim 1 wherein the long chain alcohol is present in the amount of 0.05 to 2% by weight, based on the total weight of the ink.

7. The ink of claim 6 wherein the long chain alcohol is present in the amount of 0.07 to 0.09% by weight, based on the total weight of the ink.

8. The ink of claim 6 wherein the long chain alcohol is present in the amount of 0.1 to 0.2% by weight, based on the total weight of the ink.

9. An ink set for printing at least two distinct colors on a print medium, the ink set comprising:
 (a) a first ink comprising
  (1) an aqueous carrier medium;
  (2) a colorant; and
  (3) at least one long chain alcohol having at least 8 carbon atoms, present in an amount of 0.05 to 5% by weight, based on the total weight of the ink, and
 (b) a second ink containing an aqueous carrier medium and a colorant; wherein the colorant in at least one of said first and second inks comprises a pigment dispersion.

10. The ink set of claim 9 wherein the colorant of said first ink comprises a pigment dispersion containing a pigment and a dispersant.

11. The ink set of claim 10 wherein the dispersant is a polymeric dispersant.

12. The ink set of claim 11 wherein said polymeric dispersant is a block or graft copolymer, and wherein the ink composition comprises approximately 0.1 to 8% pigment, 0.1 to 8% block or graft copolymer, 79 to 99.75% aqueous carrier medium and 0.05 to 5% by weight of the long chain alcohol, based on the total weight of the ink.

13. The ink set of claim 9 wherein the long chain alcohol is selected from the group consisting of octanol, tetradecanol, undecanol, stearyl alcohol, 2-decanol, decanol, 2-dodecanol, 1,2-dodecanediol, tridecanol, hexadecanol, 1,12-dodecanediol, 1,2-decanediol, 1,10-decanediol, 4-decanol, 2-octanol, 3-octanol, nonanol, 2-undecanol, 2-tetradecanol, 1,2-tetradecanediol, 1,14-tetradecanediol, heptadecanol and mixtures thereof.

14. The ink set of claim 9 wherein the long chain alcohol is present in the amount of 0.05 to 2% by weight, based on the total weight of the ink.

15. The ink set of claim 14 wherein the long chain alcohol is present in the amount of 0.1 to 0.2% by weight, based on the total weight of the ink.

* * * * *